April 15, 1952   H. A. ANDREW   2,592,638
FEEDER FOR LIVESTOCK OR POULTRY
Filed May 2, 1950
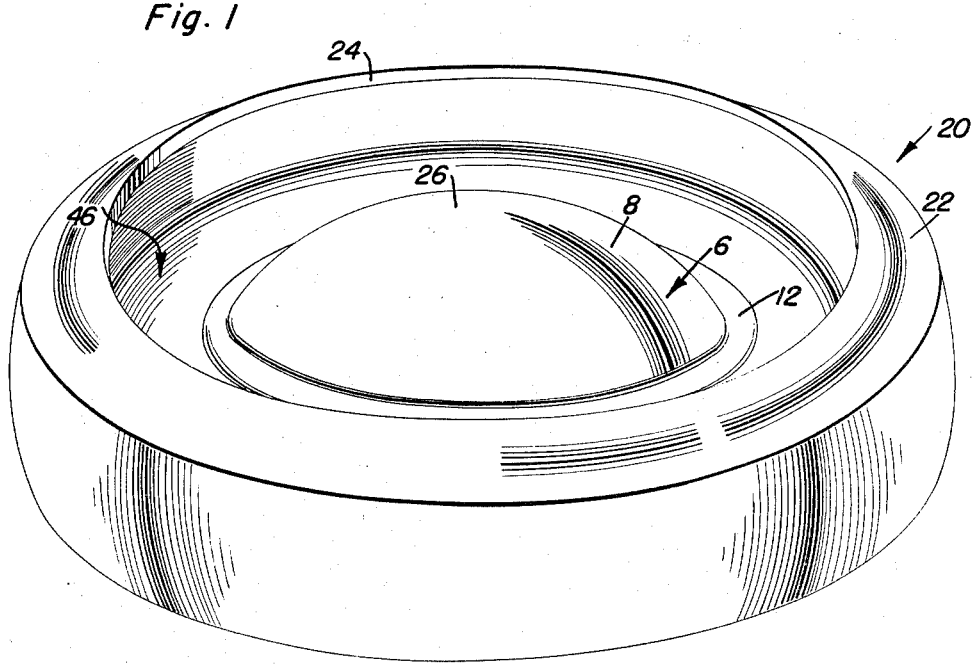
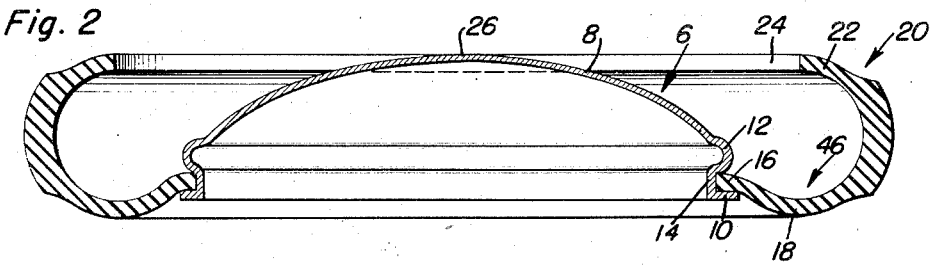
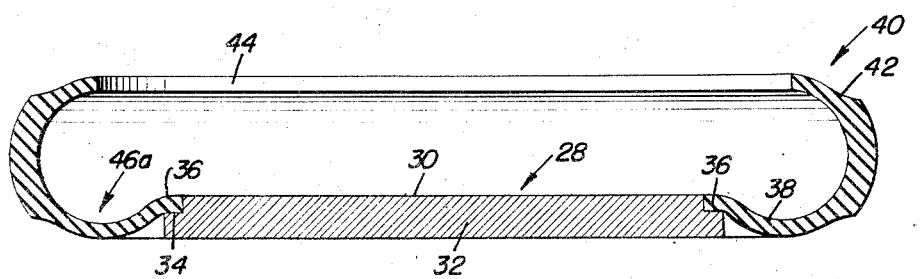
Harry A. Andrew
INVENTOR.

Patented Apr. 15, 1952

2,592,638

UNITED STATES PATENT OFFICE 2,592,638

FEEDER FOR LIVESTOCK OR POULTRY

Harry A. Andrew, Grand River, Iowa

Application May 2, 1950, Serial No. 159,558

2 Claims. (Cl. 150—0.5)

The present invention relates to feeders and waterers which are adapted for use by livestock as well as poultry and has more particular reference to a simple receptacle-type receiver which is adapted to be placed flat on the ground or other equivalent foundation where same is readily accessible for expedient use.

As the introductory statement implies, I am aware, obviously, that feeders and waterers representing what may be classified as the prior art in this field of endeavor are of many and varied styles and forms. In the simple category at bar and generically comprehended, one may assume that, for the most part, the ordinary or average feeder which is placed on the ground may be a large pan, a structure of tub-like form or an elongated trough with the trough of suitable cross sectional form.

In carrying out the aims of the instant matter, I have found that it is quite expedient and practicable to employ used tire casings so that with an insert or equivalent filler, a tire casing may be transformed into an aptly constructed and usable container for feed and water.

More specifically, novelty in the instant matter is predicated on a circular or discoidal bottom member which is marginally surrounded by a pneumatic tire casing, one beaded wall of the casing being attached to and surrounding the peripheral edge of the stated member and being adequately joined thereto whereby to provide a satisfactory circular type receiver or receptacle.

One form of the invention has to do with a simple wooden disk, the upper portion of which is reduced to provide an annular ledge, said ledge serving to seat and permit the beaded wall of a tire casing to be joined therewith with the two parts, the disk and casing, combining to define a simple pan-like receptacle.

Another embodiment of the invention has to do with a sheet metal relatively shallow dome also of circular or discoidal form, the same having marginal portions expressly stamped and fashioned to facilitate the accommodation and retention of the coacting beaded wall of the tire casing.

Other objects and advantages will become more readily apparent from the following description and the accompanying illustrative drawings.

In the accompanying sheet of drawings wherein like numerals are employed to designate like parts throughout the views:

Figure 1 is a perspective view of a feeder for livestock or poultry constructed in accordance with the principles of the present invention.

Figure 2 is a cross sectional view through the same.

Figure 3 is a cross sectional view similar to Figure 2 but showing a modified form of the invention.

Referring now to the drawings by reference numerals and lead lines and with reference to Figures 1 and 2, the bottom forming member is denoted by the numeral 6. This is of circular or discoidal form in plan view but generally observed, represents a sort of a dome. That is to say, it includes a concavo-convex body portion 8 with an especially designed marginal rim. The rim has an annular flange 10 of endless outstanding form which in conjunction with an endless bead 12 defines an intervening channel 14 for reception of the bead portion 16 of the wall 18 of the used tire casing 20. The remaining side wall of the tire casing, the upper wall in the drawings, is denoted by the numeral 22 and it will be observed that the beaded portion of this is cut away to leave a smooth mouth portion 24. It follows that the wall 22 provides an overhanging rim and mouth, the tread portion provides a feed and water combining rim and the wall 18 in conjunction with the insert of member 6 provides a substantially fluid tight bottom. The crown 26 of the concavo-convex dome 8 is generally on a level with the entrance or mouth portion 24.

In the modification shown in Figure 3, the insert or bottom member takes the form of a wooden or equivalent disk 28. The upper portion 30 of this is reduced in diameter and the lower or body portion 32 is of a diameter so that the two portions together define an annular ledge 34 to accommodate the bead portion 36 of the lower side wall 38 of the tire casing 40. Here again, the upper wall 42 is relieved or cut away to provide a smooth-edged entrance or mouth portion 44. In Figure 2, the numeral 46 designates a sort of a trough and in Figure 3, the numeral 46a designates a corresponding trough.

It is obvious, especially in the form of the invention shown in Figure 3, that one may cut a circular piece of wood to form the bottom and then rabbet the upper marginal portion to provide a ledge and thus plug the same into the bottom opening of a used or discarded pneumatic tire casing to employ the two simple elements in making up a feeding receptacle. Preferably it is desirable to relieve or cut away the inner edge portion of the top wall of the tire casing to provide a larger entrance or mouth. In practice, the bead 36 may be glued or otherwise sealed to the ledge 34 (not shown).

A more secure and substantially indestructable type of feeder and waterer is shown in the form of the invention depicted best in Fig. 2 where the channeled rim of the dome-like insert 6 provides an ideal ways and means of accommodating the beaded wall 18 of the tire casing 20.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. A device of the class described comprising a concavo-convex filler insert having a marginal rim, said rim having an outstanding annular flange and an outstanding annular bead, said bead and flange forming an intervening channel, a pneumatic tire casing substantially surrounding and enclosing said insert, one beaded wall of said tire casing being snugly snapped and fitted into the channel and joining the insert and tire casing together in defining a receptacle.

2. A simple two-part feeder for livestock and poultry comprising a substantially circular concavo-convex member of general dome-shaped form with its dome disposed upwardly, said member having a marginal rim portion, said rim portion having an outstanding annular flange and a coacting outstanding annular bead, the bead being spaced from the flange and the two defining an intervening channel, and a discarded pneumatic tire casing having one complete beaded side wall at its bottom and a partially cut away side wall at its top, the latter wall having its bead and adjacent wall portion completely relieved, the beaded lower wall portion surrounding and enclosing said member and having its bead removably snapped into said channel and separably joining the member with the tire casing, the upper relieved wall of said tire casing defining an opening which is of considerably greater diameter than the outside marginal diameter of said member.

HARRY A. ANDREW.

REFERENCES CITED

The following references are of record in the file of this patent:

UNITED STATES PATENTS

| Number | Name | Date |
|---|---|---|
| 453,719 | Leonard | June 9, 1891 |
| 529,478 | Bull | Nov. 20, 1894 |
| 1,374,960 | Shipman | Apr. 19, 1921 |
| 1,949,567 | Goddard | Mar. 6, 1934 |
| 2,199,845 | Wolf | May 7, 1940 |